(12) United States Patent
Choi

(10) Patent No.: US 8,593,499 B2
(45) Date of Patent: Nov. 26, 2013

(54) APPARATUS AND METHOD FOR IMPROVING VIDEO TELEPHONY QUALITY USING METADATA BASED ON RADIO SIGNAL STRENGTH

(75) Inventor: Woo-Young Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 303 days.

(21) Appl. No.: 13/081,817

(22) Filed: Apr. 7, 2011

(65) Prior Publication Data
US 2011/0249080 A1 Oct. 13, 2011

(30) Foreign Application Priority Data

Apr. 7, 2010 (KR) .................. 10-2010-0031708

(51) Int. Cl.
H04N 7/14 (2006.01)

(52) U.S. Cl.
USPC .................. 348/14.01; 348/14.11; 455/422.1; 455/90.1

(58) Field of Classification Search
USPC ............... 348/14.01–14.16; 370/229–240, 370/259–271, 351–356; 709/201–207, 709/217–248; 455/3.01–426.2, 445–466, 455/550.1–560, 575.1–575.9
See application file for complete search history.

(56) References Cited

U.S. PATENT DOCUMENTS

| | | | |
|---|---|---|---|
| 6,611,674 B1 * | 8/2003 | Jokimies et al. | 455/69 |
| 7,307,980 B1 * | 12/2007 | Shah | 370/352 |
| 7,468,983 B2 * | 12/2008 | Requena et al. | 370/401 |
| 2007/0060163 A1 * | 3/2007 | Jabri et al. | 455/450 |
| 2008/0013528 A1 * | 1/2008 | Miller et al. | 370/352 |
| 2010/0022226 A1 * | 1/2010 | Yang et al. | 455/414.1 |
| 2010/0134590 A1 * | 6/2010 | Lindstrom et al. | 348/14.11 |
| 2011/0170408 A1 * | 7/2011 | Furbeck et al. | 370/230 |

* cited by examiner

Primary Examiner — Hemant Patel
(74) Attorney, Agent, or Firm — Jefferson IP Law, LLP

(57) ABSTRACT

A method and apparatus for Video Telephony (VT) based on the radio signal strength in a radio terminal are provided. The method includes performing a signaling process for the VT, determining audio/video codecs to be used in the VT by considering the radio signal strength during the signaling process, performing the VT, and reconfiguring the audio/video codecs to be used in a VT process by considering the radio signal strength during the VT.

16 Claims, 7 Drawing Sheets

APPARATUS AND METHOD FOR IMPROVING VIDEO TELEPHONY QUALITY USING METADATA BASED ON RADIO SIGNAL STRENGTH

PRIORITY

This application claims the benefit under 35 U.S.C. §119 (a) of a Korean patent application filed in the Korean Intellectual Property Office on Apr. 7, 2010 and assigned Serial No. 10-2010-0031708, the entire disclosure of which is hereby incorporated by reference.

BACKGROUND OF THE INVENTION

1. Field of the Invention

The present invention relates to an apparatus and method for improving Video Telephony (VT) quality. More particularly, the present invention relates to an apparatus and method for improving Video Telephony (VT) quality by using metadata determined by processing received radio signal strength which is network status information during VT of a portable terminal that uses a 3G-324M protocol for the VT in a mobile communication network.

2. Description of the Related Art

In a $3^{rd}$ Generation (3G) network, which is a mobile communication network, Video Telephony (VT) is conducted using a 3G-324M protocol which is an international standard. Maximum capacity of video, audio, and data recommended by the standard varies depending on capacity of a data transmission device, but is typically 64 kbps. Herein, the maximum capacity is 48 to 50 kbps for video, 4 to 12 kbps for audio, and 2 kbps for data.

A VT service based on the 3G-324M protocol requires mutual compatibility between mobile communication service providers, and is defined in the international standard in order to provide simple and accurate services between users.

As a VT protocol, the 3G-324M is a telephony method in which protocol exchange is performed between terminals in an end-to-end manner. To establish a connection, information is exchanged by initially performing several processes for protocol signaling.

Such a process is greatly affected by the radio signal strength of the 3G network. A data transmission/reception rate varies depending on the radio signal strength of the 3G network, which has a great effect on a connection success rate and call quality.

However, since the protocol is a data transfer protocol between terminals, maximum transmission/reception capacity is limited, and also a 3G network operation of a mobile communication service provider is limited. Due to such a disadvantage, a final VT user inevitably receives poor quality video/audio services.

In particular, a fixed bandwidth of 48 kbps allocated for video transmission of VT is insufficient to provide high quality video. Since a status and property of a network through which data is transmitted in practice are not considered, VT quality is frequently degraded.

The radio signal strength is not considered in the 3G network in the VT of the related art, and thus the following problems are present.

First, since a network status of a peer terminal is not considered in a signaling process in which protocol data is exchanged, it is difficult to improve a connection success rate and quality.

Second, since audio/video codecs used in a call connection are determined always according to priority, a codec with better quality cannot be selectively used according to the network status.

Third, when data allocated to each channel is not completely filled due to the use of the fixed bandwidth, the remaining capacity is filled with stuffing data, and thus it is difficult to improve audio/video quality because of ineffective use of the bandwidth.

Fourth, since a protocol operates irrespective of the network status, VT quality deteriorates in comparison with terminal performance.

Therefore, a need exists for an apparatus and method for improving VT quality using meta data based on a radio signal.

SUMMARY OF THE INVENTION

Aspects of the present invention are to address at least the above-mentioned problems and/or disadvantages and to provide at least the advantages described below. Accordingly, an aspect of the present invention is to provide an apparatus and method for improving Video Telephony (VT) quality by using meta-data based on the radio signal strength.

Another aspect of the present invention is to provide an apparatus and method capable of providing a user with optimal VT quality in such a manner that a change in the radio signal strength of a network is recognized even during VT by supporting dynamic codec selection and detailed codec configuration based on the radio signal strength of the network in order to improve the quality of VT through the static 3G-324M protocol operation of the related art.

In accordance with an aspect of the present invention, a method for VT based on the radio signal strength in a radio terminal is provided. The method includes performing a signaling process for the VT, determining audio/video codecs to be used in the VT by considering the radio signal strength during the signaling process, performing the VT, and reconfiguring the audio/video codecs to be used in a VT process by considering the radio signal strength during the VT.

In accordance with another aspect of the present invention, a radio terminal apparatus for performing VT based on the radio signal strength is provided. The apparatus includes a controller for performing a signaling process for the VT, for determining audio/video codecs to be used in the VT by considering the radio signal strength during the signaling process, for performing the VT, and for reconfiguring the audio/video codecs to be used in a VT process by considering the radio signal strength during the VT, and a modem for transmitting and receiving information for the signaling and the VT.

Other aspects, advantages, and salient features of the invention will become apparent to those skilled in the art from the following detailed description, which, taken in conjunction with the annexed drawings, discloses exemplary embodiments of the invention

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
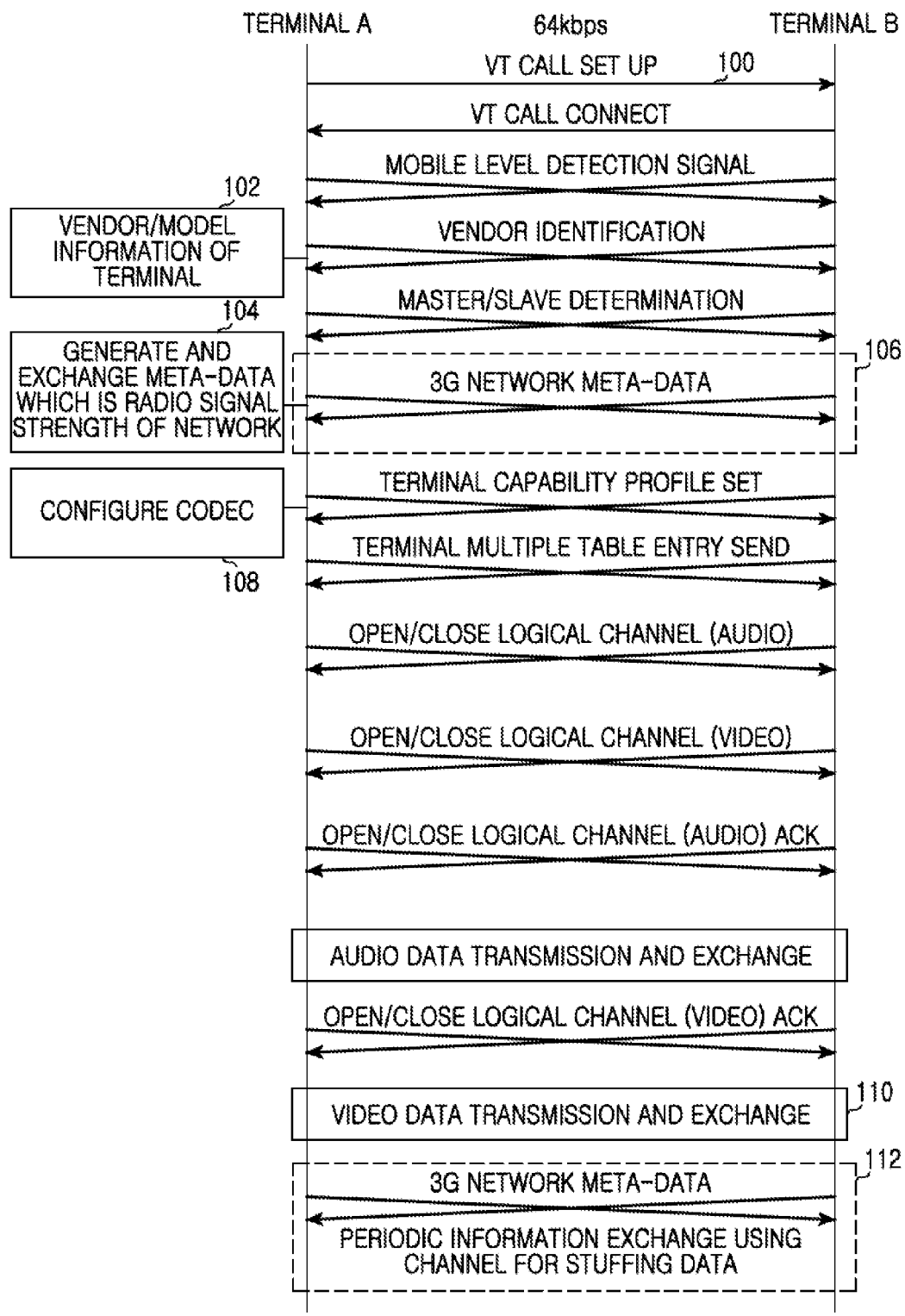
FIG. 1 illustrates a signaling process of a Video Telephony (VT) system based on radio signal strength according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention described hereinafter relate to an apparatus and method for improving Video Telephony (VT) quality using meta-data based on radio signal strength.

Exemplary embodiments of the present invention propose the following aspects. First, a network meta-data module is proposed. The module generates network meta-data by monitoring a radio signal strength status of a current network. Second, a radio signal strength indication message is proposed. The message is an H.245 protocol-based radio signal strength message generated from the network meta-data delivered from the network meta-data module. A codec is dynamically selected/configured by delivering the radio signal strength when performing signaling to establish an initial connection to a peer terminal.

Third, a dynamic H.245 terminal capability set based on the radio signal strength is proposed. The set is related to dynamic configuration of an audio/video codec table based on strong radio signal strength or weak radio signal strength.

Fourth, it is proposed to reconfigure codec information based on the radio signal strength. This is, for changing detailed codec configuration based on the strong radio signal strength or the weak radio signal strength.

Fifth, it is proposed to add an algorithm for applying network meta-data transmission/reception to an H.223 Mux/Demux module. The network meta-data is periodically delivered instead of stuffing data which is filled when a Protocol Data Unit (PDU) size is less than or equal to 64 k.

In an overall system of a $3^{rd}$ Generation (3G) network for VT used in exemplary embodiments of the present invention, a circuit switched network includes a Node B to serve as a Base Station (BS), a Radio Access Network (RAN) which is a BS subsystem of the Node B, a Mobile-Service Switching Center (MSC)/Visitor Location Register (VLR) corresponding to a core network of a circuit switched domain, a Home Location Register (HLR), a gateway MSC, etc.

The MSC provides call control and mobility management of the terminal. The VLR and the HLR are subscriber information matching devices and provide information registration, management, or the like of the terminal. Further, service providers' networks are connected to each other via the gateway MSC.

In a VT system, terminals at both ends exchange video streams through a network such as a packet switched network or a circuit switched network. For data control, the terminals commonly use the H.245 protocol.

In the H.245 protocol, a control message is transmitted/received to mediate channels and performance between the terminals. Examples of these messages include terminal capability exchange, open/close logical channel, mode request, flow control, general command and indication, etc.

Further, the control messages can be used to support master/slave determination, capability exchange on performance between the two terminals, logical channel signals and bidirectional logical channel signals, close logical channel signaling mode request, determination on delay, etc.

Furthermore, the H.245 protocol provides compatibility negotiation between terminals and Quality of Service (QoS) control. The QoS control includes frame/bit rate regulation, video size regulation, fast update request, etc.

FIG. 1 illustrates a signaling process of a VT system based on radio signal strength according to an exemplary embodiment of the present invention.

Referring to FIG. 1, terminals A and B transmit VT call set up and VT call connection messages to perform VT in step 100. Thereafter, the following procedure is performed.

The procedure includes a mobile level detection operation for determining a data integrity verification and error correction of the VT, a Master Slave Determination (MSD) operation for determining priority between a terminal and its peer entity, a Terminal Capability profile Set (TCS) operation for performance information exchange of audio/video codecs, a terminal Multiple table Entry Set (MES) operation for determining packet information and a size of transmission data, and an Open Logical Channel (OLC) operation for opening and configuring a logical channel of final audio/video.

Herein, in each operation, protocol data is transmitted/received by using repetitive and complex processes of request and acknowledge between transmitting/receiving terminals. The radio signal strength of a network has a significant effect on these processes.

According to the radio signal strength of the network, a data transmission/reception rate changes significantly, and also a VT connection success rate and call quality change significantly. Herein, vendor and model information of the terminal is exchanged in step 102 for vendor identification exchange.

In an exemplary implementation, the terminals A and B generate and exchange network meta-data which indicates the radio signal strength in steps 104 and 106. Audio/video codec information is exchanged based on the radio signal strength, and a corresponding codec is configured according to the exchanged information in step 108.

Thereafter, VT is performed, and audio/video data are exchanged when the VT is performed in step 110. In an exemplary implementation, the network meta-data is exchanged between the terminals A and B even during the VT in step 112. In this case, the network meta-data is located on a stuffing data region.

Figure 2A:
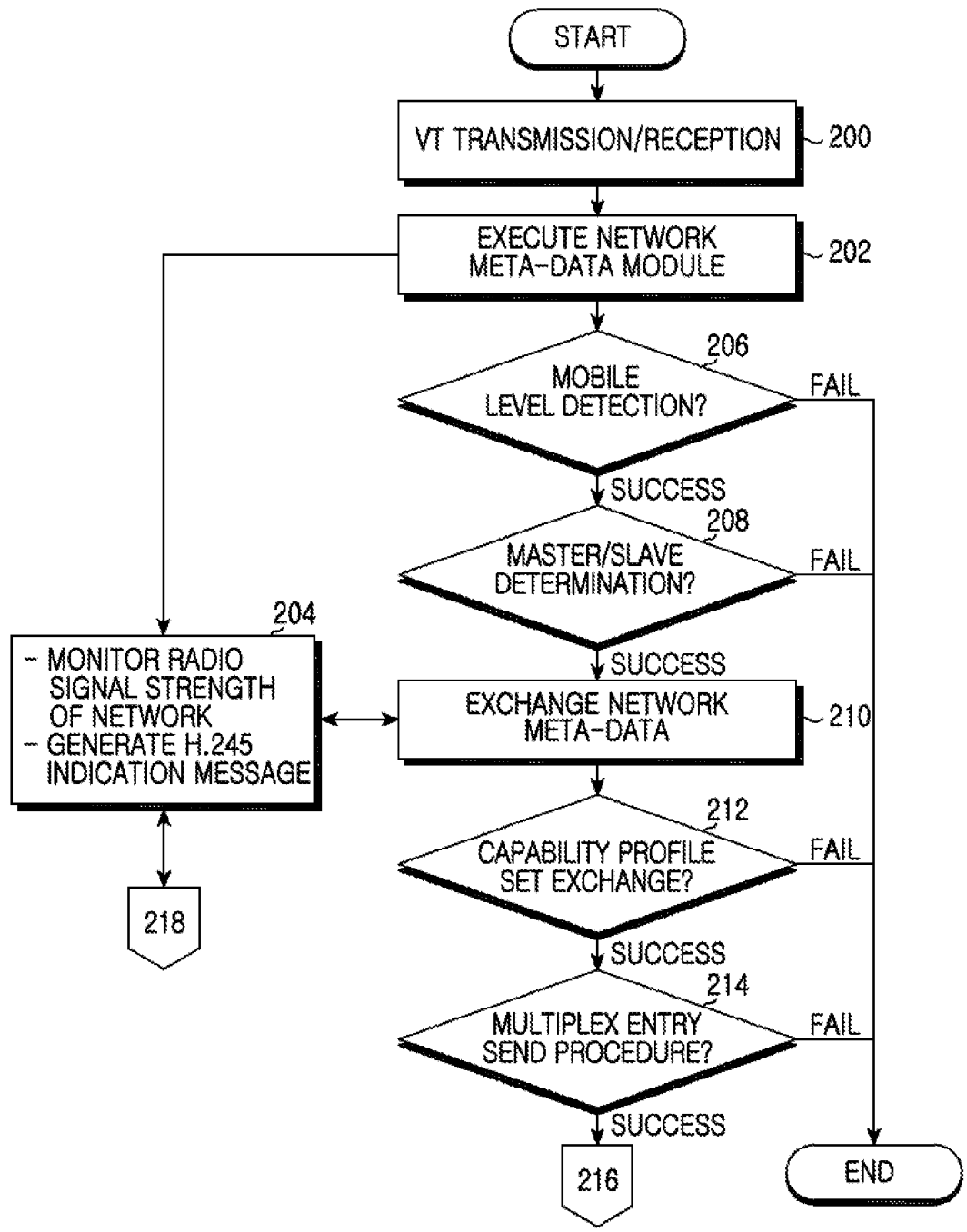
FIGS. 2A and 2B illustrate a flowchart of a VT process based on radio signal strength according to an exemplary embodiment of the present invention.
Figure 2B:
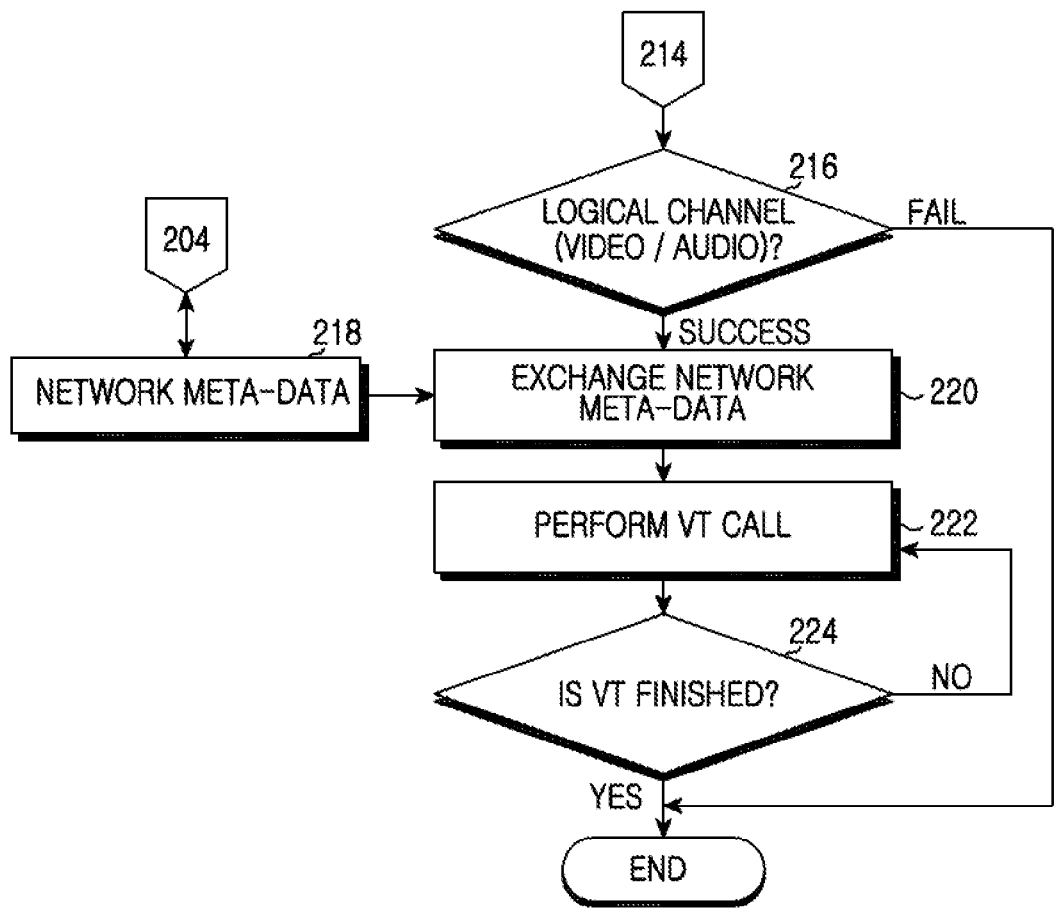

FIGS. 2A and 2B illustrate a flowchart of a VT process based on radio signal strength according to an exemplary embodiment of the present invention.

Referring to FIGS. 2A and 2B, terminals A and B start a signaling process specified in the protocol in order to perform VT transmission/reception in step 200. That is, the signaling process for VT starts.

Thereafter, a network meta-data module of an exemplary embodiment of the present invention is executed in step 202. The network meta-data module is for generating network meta-data which indicates the radio signal strength. In an exemplary implementation, signaling is performed in consideration of the radio signal strength by using the network meta-data module.

When the network meta-data module is executed, the network meta-data module generates an H.245 indication message by monitoring the radio signal strength in step 204. The network meta-data module exchanges the network meta-data in step 210 in the signaling process consisting of steps 206 to 216.

As described above with reference to FIG. 1, the signaling process includes a mobile level detection operation in step 206, a master/slave determination operation in step 208, a network meta-data exchange operation in step 210, an operation of configuring codec information based on network meta-data in step 212, a Multiple table Entry Set (MES) operation for determining a transmission data size and packet information in step 214, and a logical channel determination operation in step 216.

Thereafter, H.223 Muxing is performed to transmit and receive audio/video data in step 220 and then a VT call is performed in step 222.

During the VT call, the network meta-data module exchanges new network meta-data determined by monitoring the radio signal strength in step 218 with a peer terminal through the H.223 Muxing of step 220. Such a process is repeated until the VT is finished in step 224.

Figure 3:
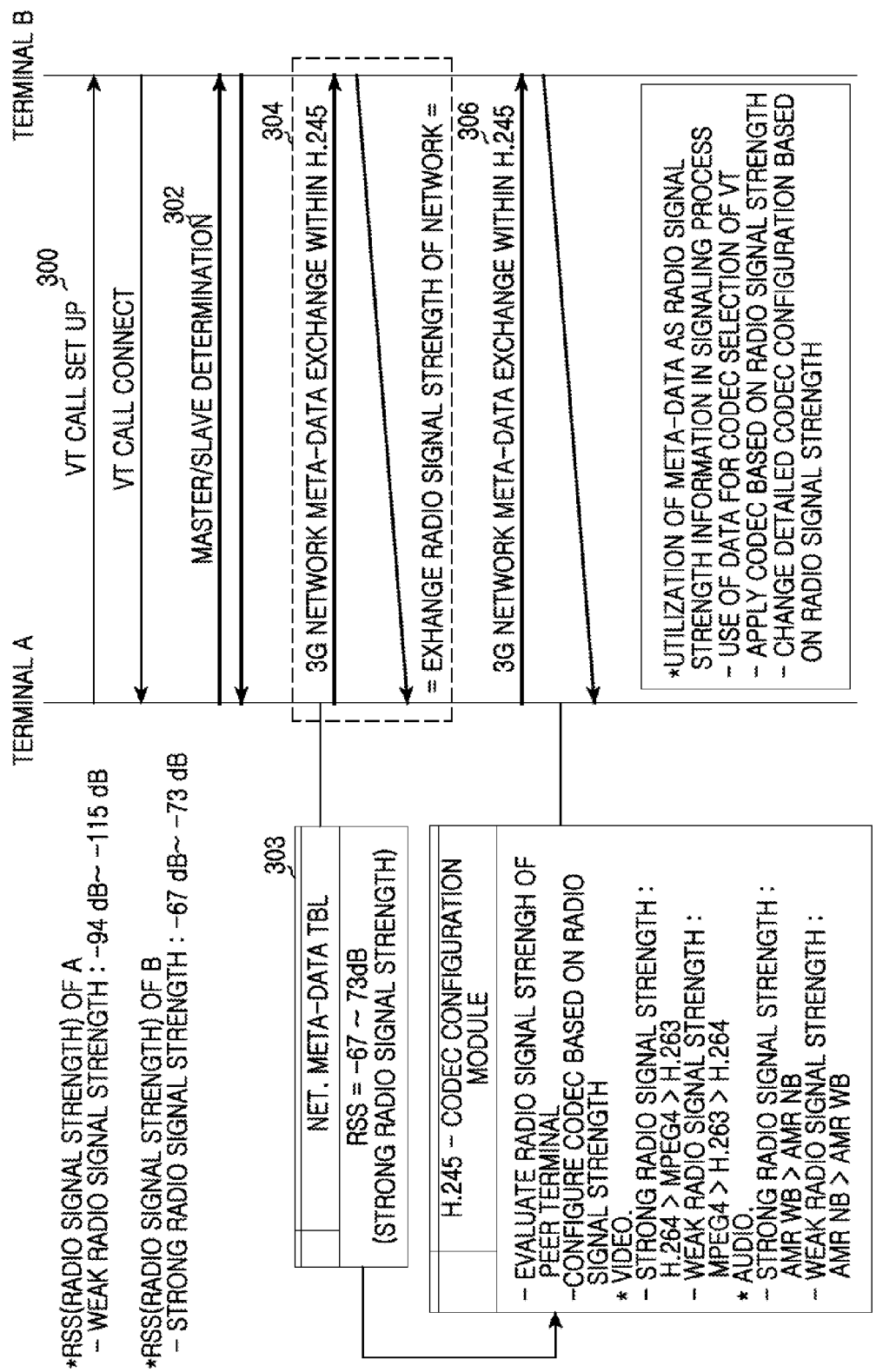
FIG. 3 illustrates a signaling process based on network meta-data according to an exemplary embodiment of the present invention.

FIG. 3 illustrates a signaling process based on network meta-data according to an exemplary embodiment of the present invention.

Referring to FIG. 3, terminals A and B start a signaling process specified in the protocol in order to perform VT transmission/reception in step 300. That is, the signaling process for VT starts.

Thereafter, a master/slave determination operation in step 302 is performed during the signaling process as described above, and network data which indicates the radio signal strength is exchanged in step 304. In the operation of exchanging the network data, the radio signal strength of each of the terminals A and B is exchanged.

It is assumed herein that the terminal A is in a weak radio signal strength status with respect to a Base Station (BS) of the terminal A, and the terminal B is in a strong radio signal strength status with a BS of the terminal B. The radio signal strength is stored in a network meta-data table 303 of each terminal.

Thereafter, based on the exchanged radio signal strength, a Terminal Capability profile Set (TCS) exchange and codec configuration process is performed as an operation for exchanging audio/video codecs of the terminal in step 306.

Under the radio signal strength status described above, a Moving Pictures Experts Group (MPEG)-4 codec and an Adaptive Multi Rate (AMR) Narrow Band (NB) codec are used since the terminal A is in the weak radio signal strength status.

That is, if the radio signal strength is strong in both of the two terminals, audio/video codecs requiring the greatest bandwidth may be used, and if the radio signal strength is weak in both of the two terminals, audio/video codecs requiring the lowest bandwidth may be used.

In other cases except for the above cases, audio/video codecs requiring a medium or low bandwidth may be used. However, when the audio/video codecs are determined according to the radio signal strength, the audio/video codecs may vary depending on simulations, service providers, vendors, etc.

If the radio signal strength is above a threshold range, it is determined that the radio signal strength is strong. If the radio signal strength is below the threshold range, it is determined that the radio signal strength is weak. If the radio signal strength is within the threshold range, it is determined that the radio signal strength is medium.

Figure 4:
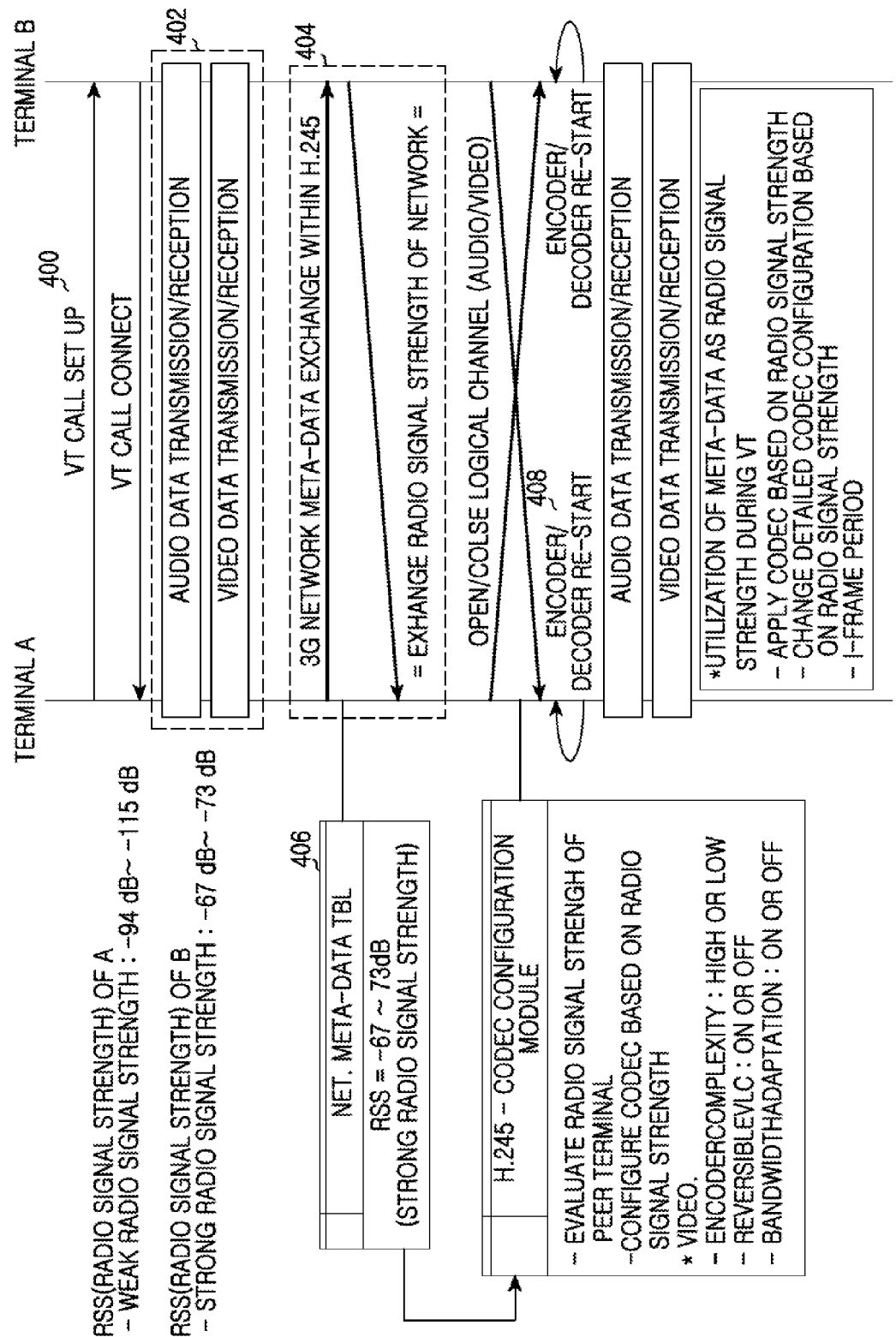
FIG. 4 illustrates a codec reconfiguration process based on network meta-data during VT according to an exemplary embodiment of the present invention.

FIG. 4 illustrates a codec reconfiguration process based on network meta-data during VT according to an exemplary embodiment of the present invention.

Referring to FIG. 4, terminals A and B start a signaling process specified in the protocol in order to perform VT transmission/reception in step 400. That is, the signaling process for VT starts.

Thereafter, a signaling process including codec configuration using the radio signal strength is performed as described above to perform the VT by transmitting and receiving audio/video data in step 402.

In an exemplary implementation, a network meta-data exchange process for exchanging the radio signal strength is performed during the VT in step 404. In the operation of exchanging the network data, the radio signal strength of each of the terminals A and B is exchanged.

It is assumed herein that the terminal A is in a weak radio signal strength status with respect to a BS of the terminal A, and the terminal B is in a strong radio signal strength status with a BS of the terminal B. The radio signal strength is stored in a network meta-data table 406 of each terminal. The radio signal strength can be transmitted by being stored in a stuffing region.

Thereafter, based on the exchanged radio signal strength, a logical channel configuration process is performed again between the terminals A and B, and thus a codec for the VT is reconfigured in step 408. In the codec reconfiguration process, complexity of an encoder can be increased or decreased according to the radio signal strength of the terminal, ReversibleVLC can be turned on or off, and a bandwidth regulation function can be turned on or off. Upon completion of the codec configuration, the terminals A and B restart a corresponding codec (i.e., encoder or decoder). Thereafter, the VT is performed again based on the reconfigured codec.

Figure 5:
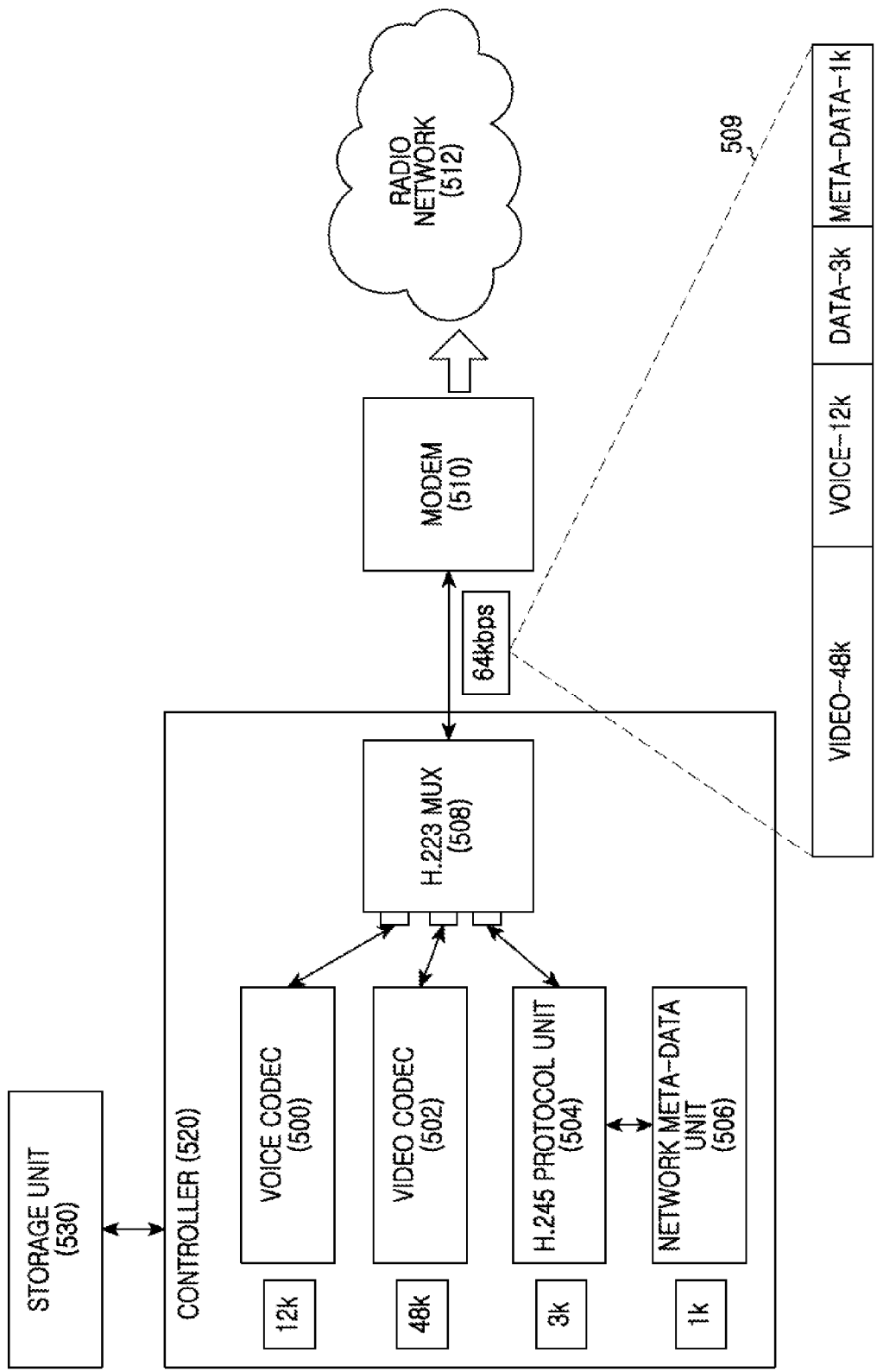
FIG. 5 is a block diagram illustrating a structure of a terminal according to an exemplary embodiment of the present invention.

FIG. 5 is a block diagram illustrating a structure of a terminal according to an exemplary embodiment of the present invention.

Referring to FIG. 5, the terminal includes a modem 510, a controller 520, and a storage unit 530. The controller 520 includes a voice codec 500, a video codec 502, an H.245 protocol unit 504, a network meta-data unit 506, and an H.223 Multiplexer (Mux) 508.

The modem 510 is a module for communicating with another node, and includes a radio processor and a baseband processor. The radio processor converts a signal received through a radio path into a baseband signal and provides the baseband signal to the baseband processor. Further, the radio processor converts a baseband signal received from the baseband processor into a radio signal so that the signal can be transmitted on the radio path, and transmits the converts radio signal through an antenna.

The controller 520 provides overall control to the terminal. Further, according to an exemplary implementation, the controller 520 controls the voice codec 500, the video codec 502, the H.245 protocol unit 504, the network meta-data unit 506, and the H.223 Mux 508.

The storage unit 530 stores a program for controlling an overall operation of the terminal and temporary data generated during the program is executed. More particularly, according to an exemplary embodiment of the present invention, the storage unit 530 stores a meta-data table.

The voice codec 500 and the video codec 502 perform encoding and decoding on audio/video data used in VT.

The H.245 protocol unit 504 transmits and receives control messages to mediate channels and performance between terminals. The control messages are used for performing operations of capability exchange, opening and closing of logical channels, mode request, flow control, and general command and indication.

The control messages may be used to support master/slave determination, capability exchange for performance between two terminals, logical channel signaling and bidirectional logical channel signaling, close logical channel signaling mode request, determination on delay, etc.

The network meta-data unit 506 correctly gathers a current network status, and periodically delivers the gathered network status to the H.245 protocol unit 504. The H.245 protocol unit 504 parses the gathered network status information, converts the information into an H.245 message having a message format, and delivers the message to a peer terminal through a radio network 512.

The H.223 Mux 508 transmits and receives audio/video information 509 by performing multiplexing and de-multiplexing on the audio/video information. Further, the H.223 Mux 508 periodically transmits the network status information by adding the information to PDU data during VT or parses network status information of the peer terminal from received PDU data and delivers the information to the H.245 protocol unit 504.

In the aforementioned structure, the controller 520 can perform functions of the voice codec 500, the video codec 502, the H.245 protocol unit 504, the network meta-data unit 506, and the H.223 Mux 508. However, these elements are separately configured and illustrated in the present disclosure for exemplary purposes.

Therefore, when a product is implemented in practice, all of the functions of the voice codec 500, the video codec 502, the H.245 protocol unit 504, the network meta-data unit 506, and the H.223 Mux 508 may be processed by the controller 520, or only some of the functions may be processed by the controller 520.

That is, the controller 520 can perform the aforementioned processes of FIGS. 1, 2A, 2B, 3, and 4, that is, the function of configuring a codec by using the radio signal strength of a network in an initial signaling process and reconfiguring the codec by considering a radio signal strength status of the network.

Figure 6:
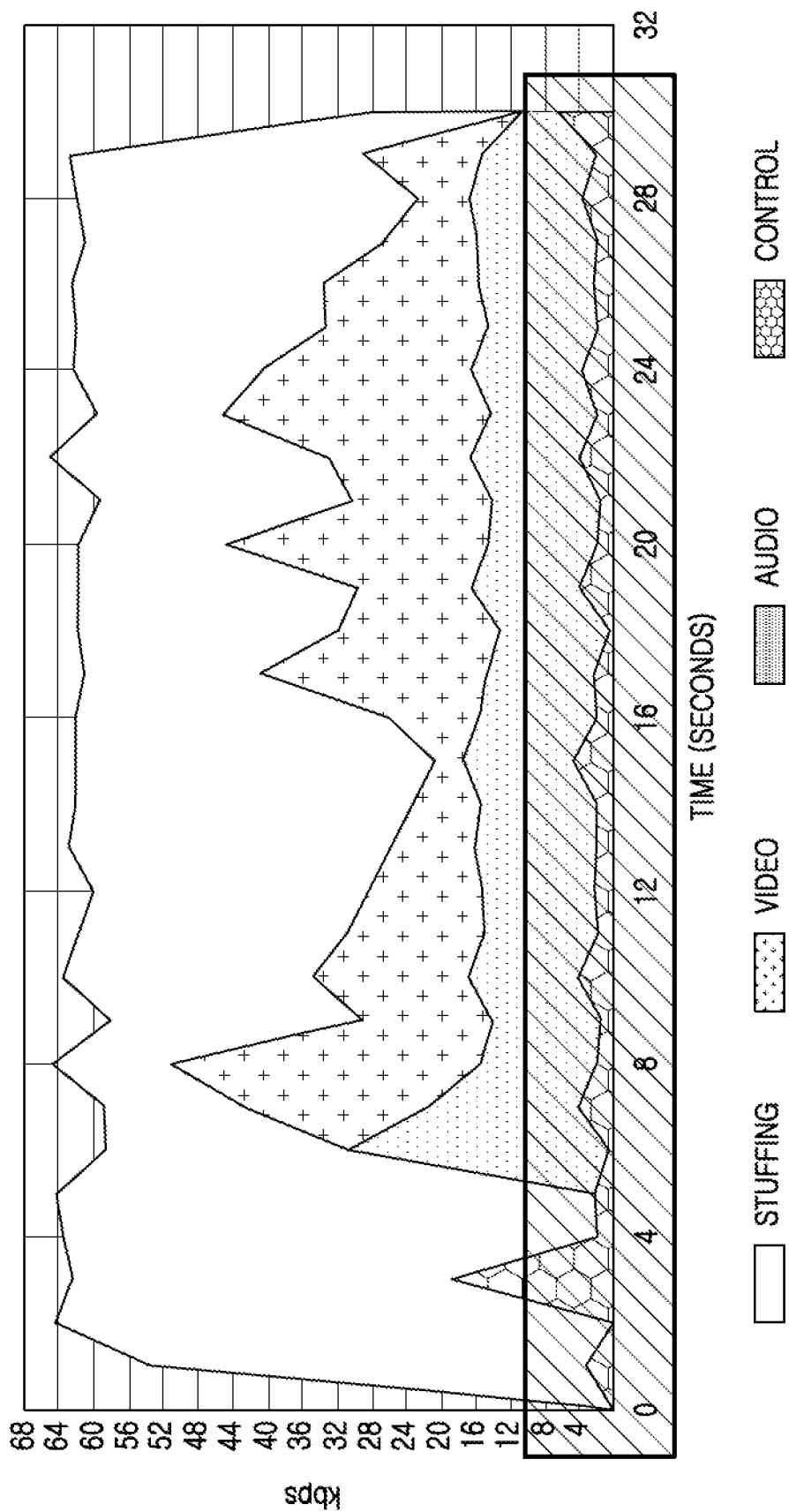
FIG. 6 illustrates a channel usage rate of VT in which radio signal strength is periodically transmitted according to an exemplary embodiment of the present invention.

FIG. 6 illustrates a channel usage rate of VT in which radio signal strength is periodically transmitted according to an exemplary embodiment of the present invention.

Referring to FIG. 6, when the radio signal strength is exchanged during the VT, instead of using a control region which is relatively narrow, a stuffing region which is an unused data region is used. As a result, bandwidth usage efficiency becomes high.

Exemplary embodiments of the present invention improve audio/video quality of the conventional VT system. By utilizing meta-data determined by processing 3G network status information (i.e., radio signal strength), VT quality can be improved in H.324M which is a VT protocol system.

More particularly, the codec is used depending on static codec priority determination, and the PDU region is used as stuffing data, which may lead to deterioration of VT quality. To address such a disadvantage, exemplary embodiments of the present invention propose to use the radio signal strength which is network status information.

In addition, in a VT connection process, the peer terminal selects audio/video codecs that guarantee best quality by considering the radio signal strength. Further, detailed codec configuration can be dynamically changed according to network information.

During the VT, current radio signal strength can be periodically delivered to the peer terminal. By using the information, codec selection and configuration can be performed dynamically. More particularly, when the radio signal strength is delivered, a region filled with stuffing data is reused, and thus a channel usage rate is significantly improved and a network resource can be effectively utilized.

According to exemplary embodiments of the present invention, the radio signal strength (or meta-data) of a network is exchanged in a protocol exchange process. Thus, audio/video codecs that can provide higher quality can be selected and used in encoding and decoding, and a detailed operation can be configured.

In addition, the network meta-data is transmitted by inserting the meta-data to stuffing data of packet data when the stuffing data is applied during VT. Thus, a peer terminal can use this information to change an encoding option, an I-frame video period, etc. As a result, VT quality can be improved.

By exchanging the radio signal strength of the network, a codec optimized for a current network status can be configured, and thus a detailed codec configuration can be changed. Thus, optimal VT quality can be provided.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for Video Telephony (VT) based on radio signal strength in a radio terminal, the method comprising:
   performing a signaling process for the VT;

determining audio/video codecs to be used in the VT by considering the radio signal strength during the signaling process;

performing the VT; and reconfiguring the audio/video codecs to be used in a VT process by considering the radio signal strength during the VT, wherein the determining of the audio/video codecs to be used in the VT by considering the radio signal strength during the signaling process comprises exchanging the radio signal strength with a peer radio terminal.

2. The method of claim 1, wherein the determining of the audio/video codecs to be used in the VT by considering the radio signal strength during the signaling process further comprises, if the radio signal strength of the radio terminal and its peer terminal is above a threshold range, determining audio/video codecs requiring a widest bandwidth as the audio/video codecs to be used in the VT.

3. The method of claim 1, wherein the determining of the audio/video codecs to be used in the VT by considering the radio signal strength during the signaling process further comprises, if the radio signal strength of the radio terminal and its peer terminal is below a threshold range, determining audio/video codecs requiring a narrowest bandwidth as the audio/video codecs to be used in the VT.

4. The method of claim 1, wherein the reconfiguring of the audio/video codecs to be used in the VT process by considering the determined radio signal strength during the VT further comprises, configuring the audio/video codecs to be used in the VT by considering the exchanged radio signal strength.

5. The method of claim 4, wherein the exchanging of the radio signal strength with the peer radio terminal comprises inserting the radio signal strength into a stuffing data region by the radio terminal and its peer radio terminal and exchanging the radio signal strength.

6. The method of claim 1, wherein a protocol for the signaling comprises H.245 and a muxing or demuxing protocol required to transmit and receive data for the signaling comprises H.223.

7. The method of claim 1, further comprising:
exchanging at least one of vendor information and model information with a peer terminal.

8. The method of claim 1, further comprising:
exchanging meta data with a peer terminal, wherein the meta data includes the radio signal strength used for the determining of the audio/video codecs to be used in the VT.

9. A radio terminal apparatus for performing Video Telephony (VT) based on radio signal strength, the apparatus comprising:

a controller for performing a signaling process for the VT, for determining audio/video codecs to be used in the VT by considering the radio signal strength during the signaling process, for performing the VT, and for reconfiguring the audio/video codecs to be used in a VT process by considering the radio signal strength during the VT; and a modem for transmitting and receiving information for the signaling and the VT, wherein, in the determining of the audio/video codecs to be used in the VT by considering the radio signal strength during the signaling process, the controller exchanges the radio signal strength with a peer radio terminal.

10. The apparatus of claim 9, wherein, if the radio signal strength of the radio terminal and its peer terminal is above a threshold range, the controller determines audio/video codecs requiring a widest bandwidth as the audio/video codecs to be used in the VT.

11. The apparatus of claim 9, wherein, if the radio signal strength of the radio terminal and its peer terminal is below a threshold range, the controller determines audio/video codecs requiring a narrowest bandwidth as the audio/video codecs to be used in the VT.

12. The apparatus of claim 9, wherein the controller configures the audio/video codecs to be used in the VT by considering the exchanged radio signal strength.

13. The apparatus of claim 12, wherein, in the exchanging of the radio signal strength with the peer radio terminal, the controller inserts the radio signal strength into a stuffing data region by the radio terminal and its peer radio terminal and exchanging the radio signal strength.

14. The apparatus of claim 9, wherein a protocol for the signaling comprises H.245 and a muxing or demuxing protocol required to transmit and receive data for the signaling comprises H.223.

15. The apparatus of claim 9, wherein the controller exchanges at least one of vendor information and model information with a peer terminal.

16. The apparatus of claim 9, wherein the controller exchanges meta data with a peer terminal, and wherein the meta data includes the radio signal strength used for the determining of the audio/video codecs to be used in the VT.

* * * * *